United States Patent [19]

Mueller

[11] Patent Number: 4,889,430
[45] Date of Patent: Dec. 26, 1989

[54] PLANETARY GEAR EXTRUDER FOR THE COMPOUNDING AND EXTRUSION OF PLASTIC MATERIALS

[75] Inventor: Werner Mueller, Hanover, Fed. Rep. of Germany

[73] Assignee: Hermann Berstorff Maschinenbau GmbH, Hanover, Fed. Rep. of Germany

[21] Appl. No.: 339,664

[22] Filed: Apr. 18, 1989

[30] Foreign Application Priority Data

May 4, 1988 [DE] Fed. Rep. of Germany ....... 3815061

[51] Int. Cl.$^4$ .......................... B01F 7/08; B28C 1/16
[52] U.S. Cl. ...................................... 366/85; 366/288; 366/301; 425/204
[58] Field of Search ................... 366/85, 84, 297, 301, 366/287, 288, 83, 97; 425/207, 208, 204, 206, 376.1

[56] References Cited

U.S. PATENT DOCUMENTS

| | | | |
|---|---|---|---|
| 3,310,837 | 3/1967 | Wittrock | 366/85 |
| 3,640,669 | 2/1972 | Hanslik | 425/204 |
| 3,746,319 | 7/1973 | Black | 366/85 |
| 3,929,322 | 12/1975 | Hanslik | 366/85 |

*Primary Examiner*—Robert W. Jenkins
*Attorney, Agent, or Firm*—Foley & Lardner, Schwartz, Jeffery, Schwaab Mack, Blumenthal & Evans

[57] ABSTRACT

A planetary gear extruder for the compounding and extrusion of thermoplastic materials, in which an annular groove is formed in the metallic stop ring to receive a ceramic body which is engageable by the forward ends of the planetary spindles in order to reduce friction. A ceramic body may additionally also be arranged in a recess in the end face of each of the planetary spindles, aligned with and adapted to engage the ceramic body mounted in the stop ring. As a result, the coefficients of friction between the stop ring and the end faces of the spindles are reduced considerably, consequently reducing the wear on the planetary spindles themselves and the central spindle.

7 Claims, 3 Drawing Sheets

PLANETARY GEAR EXTRUDER FOR THE COMPOUNDING AND EXTRUSION OF PLASTIC MATERIALS

BACKGROUND OF THE INVENTION

Planetary gear extruders are used successfully for the compounding and extrusion of thermoplastic plastic materials. One field of application of the planetary gear extruder is in the compounding of polyvinylchloride (PVC) to be fed into a roll nip of a calender for calendering into a film web.

The planetary gear extruder represents a planetary compounding unit in which the main spindle is driven and, as a result, drives the planetary spindles meshing with it and with the internal gearing of the surrounding barrel. At the output end of the planetary gear extruder, a stop ring is arranged coaxially to the main spindle and partially covers the end face of the planetary spindles. The planetary spindles bear against the stop ring, which consequently absorbs the axial forces of these planetary spindles.

The axial forces of the planetary spindles on the stop ring cause, by the dry friction, a great braking effect, which necessitates a high torque for the central spindle, which drives with it the planetary spindles by the common gearing.

Furthermore, due to the braking effect of the planetary spindles against the stop ring, it is necessary to give the central spindle and also the planetary spindles and the stop ring much greater dimensions and to subject them to a special hardening process, because otherwise a disproportionate amount of wear by the gear tooth forces on the two components and on the stop ring cannot be avoided.

SUMMARY OF THE INVENTION

The object of the present invention is to provide a planetary gear extruder in which a more slender construction of the central spindle and of the planetary spindles is possible, and a saving in drive energy of the extruder drive is achieved.

In particular, the invention ensures that, even without a special hardening of the planetary spindles and the stop ring, the extruder exhibits little wear on these components.

In accordance with the invention, the stop ring is formed with an annular groove in which is positioned a ceramic body the exposed end of which is flush with the surface of the stop ring and the end faces of the planetary spindles. The mounting of the ceramic body in the groove has the effect of creating a very reliable embedding and support for the annular ceramic body, against which the planetary spindles bear with a relatively high back pressure during their rotation by the central spindle.

The coefficients of friction between the planetary spindle end faces and the stop ring constructed in accordance with the present invention are reduced by over 30% in comparison with hardened metal spindles and a conventional stop ring, so that the wear on the gearing of the planetary spindles themselves and on the driving central spindle is considerably reduced, and drive energy saved, particularly during the start-up phase. In addition, expensive hardening processes, in particular for the planetary spindles, are dispensed with.

A further improvement of these coefficients is achieved by the arrangement of a ceramic body in a recess in the end faces of the planetary spindles. By this arrangement, the ceramic bodies in the end faces of the planetary spindles run against the annular ceramic body in the annular groove of the stop ring, so that the coefficients of friction are further reduced by about 20%, in comparison with the coefficients of friction of two metal parts pressed against each other under a certain pressure, one metal part being stationary (stop ring) and one metal part rotating (planetary spindle).

The ceramic body embedded in the annular groove of the stop ring or in the recess of the end faces of the planetary spindles may, in an advantageous way, be designed as a solid ceramic body, as a composite ceramic body, or as a reinforced ceramic body, depending on the loading by the gear tooth forces, in order to be able to allow for different materials and speeds of the central spindle.

BRIEF DESCRIPTION OF THE DRAWINGS

An exemplary embodiment of the invention is explained in more detail below with reference to the drawings in which.

DETAILED DESCRIPTION OF THE PREFERRED EMBODIMENTS

Figure 1:
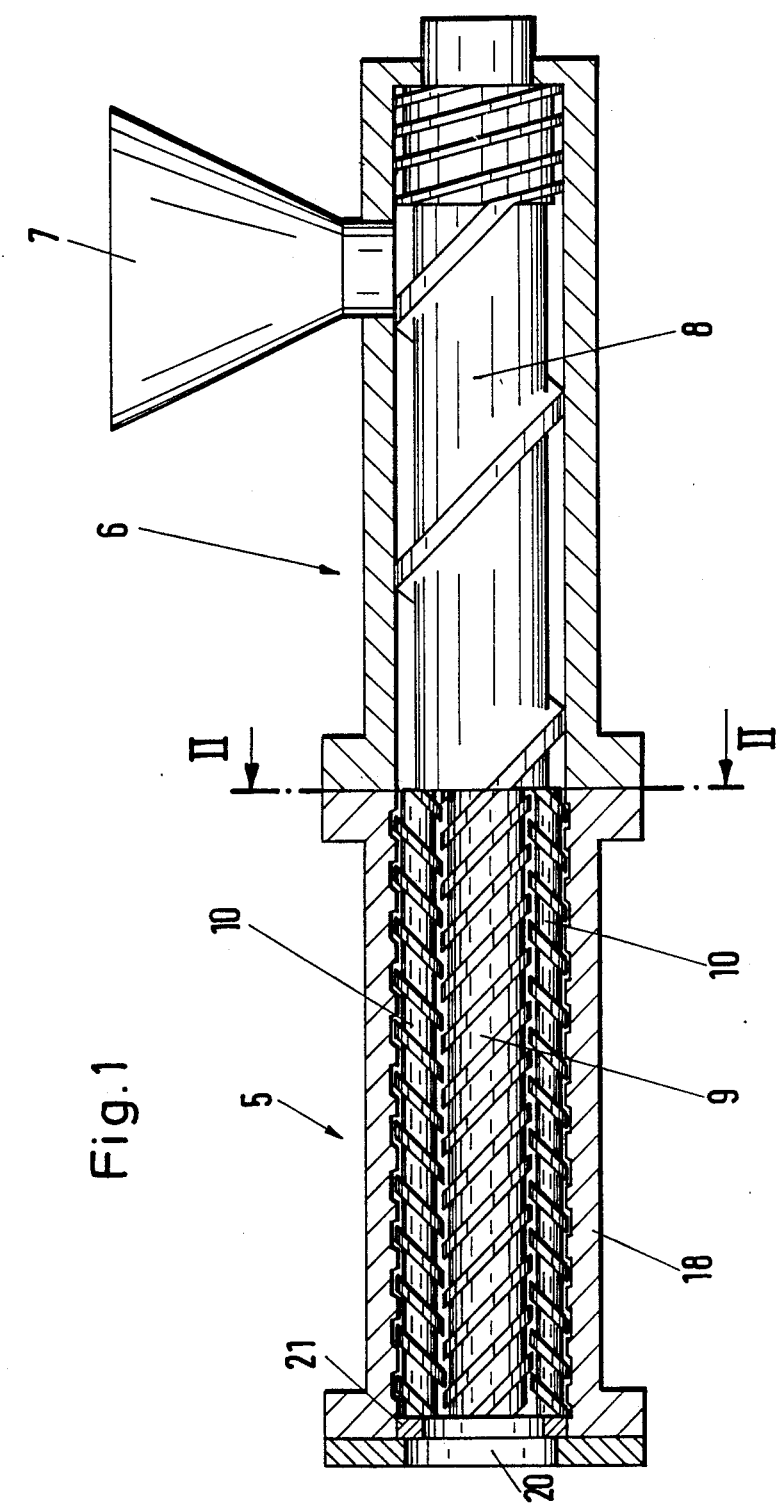
FIG. 1 is a longitudinal sectional view of the planetary gear extruder in accordance with the present invention.

The extruder consists of a feed screw unit 6 and a compounding unit 5 of planetary design. The molding material to be compounded is charged via a feed orifice 7 and taken up by the driven feed screw 8 rotating in the cylinder bore of the feed screw unit. The feed screw 8 is connected fixedly in terms of rotation to a main spindle 9 of the planetary compounding unit 5. The main spindle 9 has a helical external gearing, into which planetary spindles 10 distributed over the circumference of the main spindle 9 engage. The planetary spindles 10 mesh on the other side with internal gearing of the cylinder section 18 of the planetary compounding unit 5.

At the output end of the planetary gear extruder 5, an annular stop ring 21 is arranged coaxially to the main spindle 9. The planetary spindles 10 bear against this stop ring 21. The stop ring 21 partially covers the discharge orifice of the planetary gear extruder.

Figure 2:
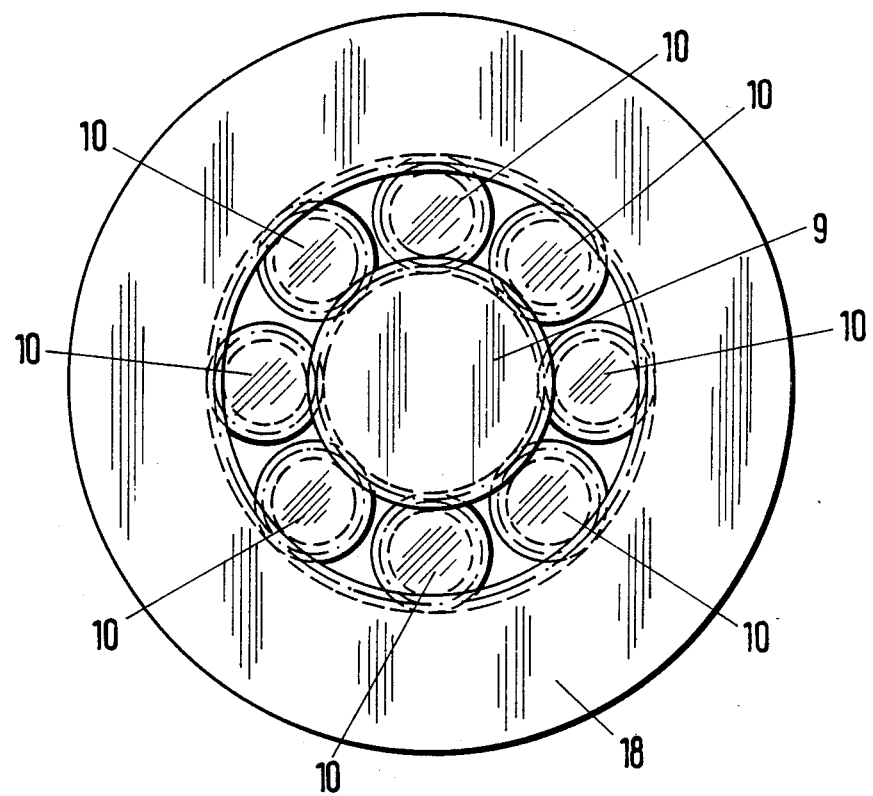
FIG. 2 is a cross sectional view of the planetary gear extruder, taken as line II—II of FIG. 1.

In the cross-section shown in FIG. 2, the planetary spindles 10 and the central spindle 9 can be seen, which rotate in the cylinder or barrel 18.

Figure 3:
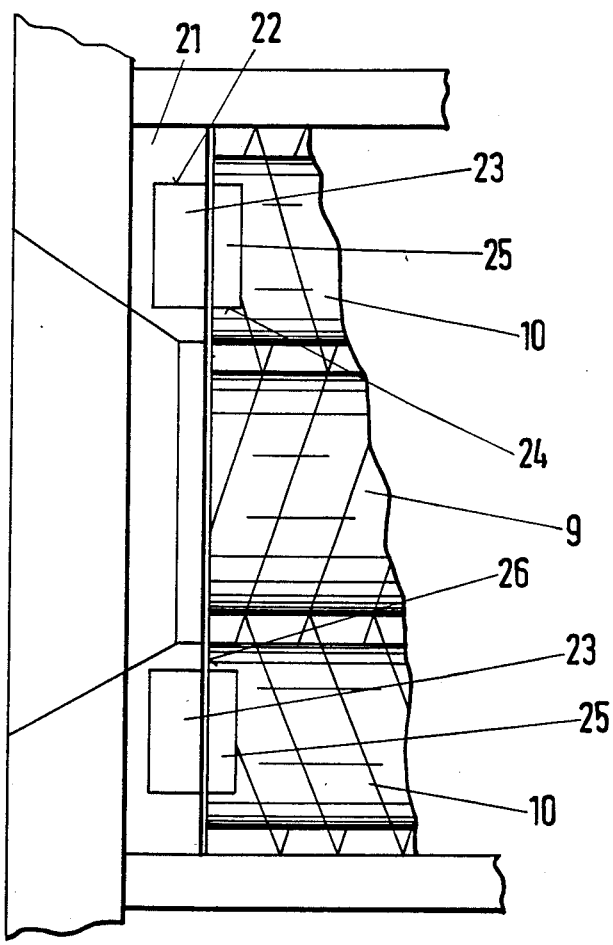
FIG. 3 is an enlarged fragmentary view of the discharge end of the extruder and showing the invention in greater detail.

In FIG. 3, the stop ring 21 is shown in enlarged form. An annular groove 22 is formed in the ring in which is arranged an annular ceramic body 23. The end face of each planetary spindle 10 is formed with a recess into which is positioned a ceramic body 25, with the ceramic bodies being aligned with the ceramic body 23 so as to engage the same during spindle rotation.

The rotation of the screw 8, into which the central spindle 9 is screwed, also causes the planetary spindles 10 to be set in rotational movement, as a result of the helical gearing of the central spindle 9 interacting with the helical gearing of the planetary spindles 10.

The planetary spindles 10 also mesh with the internal gearing of the cylinder section 18. The helical gearing of the central spindle 9, the planetary spindles 10, and the cylinder section is necessary for a conveying effect of the material to be compounded in the direction of the material discharge orifice 20.

However, the helical gearing and the rotation of the central spindle 9 produce axial forces on the spindles 10 in the direction of the orifice 20, which forces necessarily have to be absorbed by the stop ring 21.

By the arrangement of the annular ceramic body 23 in the annular groove 22 of the stop ring 21, the friction between the end faces of the planetary spindles 10 and the ceramic body is reduced considerably, thereby reducing the wear on the planetary spindles 10 and the central spindle, even if materials of high viscosity are processed. No special hardening processes for the planetary spindles and the central spindle are needed.

This friction-reducing effect is further increased by the arrangement of ceramic bodies 25 in recesses 24 in the end faces of the planetary spindles 10. By the arrangement of the annular ceramic body in the stop ring and the ceramic bodies 25 in the end faces of the planetary spindles 10, the wear of the stop ring is advantageously avoided. Furthermore, the wear on the planetary spindles is greatly reduced, in particular during the start-up phase.

What is claimed is:

1. A planetary gear extruder for the compounding and extruding of plastics material, wherein a main spindle is surrounded by and intermeshed with a plurality of planetary spindles which also mesh with gearing formed on the interior surface of the extruder cylinder, comprising:

(a) a stop ring material in said extruder adjacent the discharge end thereof and arranged coaxially to the axis of the main spindle, said stop ring being formed with an annular groove in the surface thereof facing the interior of the extruder and radially aligned with the forward ends of said planetary spindles, and (b) ceramic body means positioned in said groove in said stop ring, the exposed face of said ceramic body means being flush with said surface of said stop ring for engagement by the forward ends of said planetary spindles, whereby the frictional wear on both said stop ring and said forward ends of said planetary spindles is reduced.

2. The extruder of claim 1 further including a recess formed in the forward end of each of said planetary spindles, and a ceramic body mounted in each recess, said bodies being radially aligned with the ceramic body mounted in said stop ring for engaging the same during rotation of said planetary spindles.

3. The planetary gear extruder of claim 2, wherein said ceramic body means mounted in said stop ring and the forward ends of said planetary spindles are comprised of solid ceramic.

4. The planetary gear extruder of claim 2, wherein said ceramic body means mounted in said stop ring and the forward ends of said planetary spindles are comprised of a composite ceramic body, 5. The planetary gear extruder of claim 2, wherein said ceramic body means mounted in said stop ring and the forward ends of said planetary spindles are comprised of a reinforced ceramic body.

6. The planetary gear extruder of claim 1, wherein said annular groove in said stop ring is rectangular in cross-section.

7. The planetary gear extruder of claim 1, wherein said annular groove in said stop ring is half round in cross-section.

* * * * *